April 30, 1968    J. D. MacPETRIE ET AL    3,380,137
CYLINDRICAL INSERT CUTTING TOOL
Filed May 12, 1966

INVENTORS
JOHN D. MAC PETRIE
VICTOR MILEWSKI
BY Farley, Forster
and Farley
ATTORNEYS

United States Patent Office 3,380,137
Patented Apr. 30, 1968

3,380,137
CYLINDRICAL INSERT CUTTING TOOL
John D. MacPetrie, Bloomfield Hills, and Victor Milewski, Birmingham, Mich., assignors to The Valeron Corporation, a corporation of Michigan
Filed May 12, 1966, Ser. No. 549,524
7 Claims. (Cl. 29—105)

This invention relates to an improved construction for holding cutting inserts and, more particularly to a construction adapted for holding indexable throw-away cutting inserts made of tungsten carbide or other suitable materials.

In a typical application of the present invention, a cutting tool is used having cylindrical inserts and wherein both the tool holder and the inserts are provided with mating cylindrical surfaces. The cutting edge of each insert is provided by constructing it with some portion of the full cylindrical surface eliminated. The tool holder is provided with partially open cylindrical grooves or pockets on its periphery in which the inserts are received and with the axes of the pockets extending parallel to the rotational axis of the holder and located radially inward of the periphery of the tool holder a distance less than the radius of the cylindrical insert to expose the cutting edges of the inserts.

In one form of the present invention, full cylindrical inserts are each provided with a longitudinally extending relief groove terminating in a cutting edge at its periphery. The major cylindrical surface of each insert is left intact and is directly clamped within receptive cylindrical pockets provided on the tool holder.

In a second form of the present invention a partially cylindrical insert is shown and is both indexable and repositional end-for-end to provide another cutting edge.

In each embodiment, the longitudinally extending cutting edge of the insert and the seating surface for it is provided on one continuous cylindrical surface.

The objects and advantages of this invention can best be understood from the following detailed description of two embodiments with reference to the drawings wherein.

Figure 1:
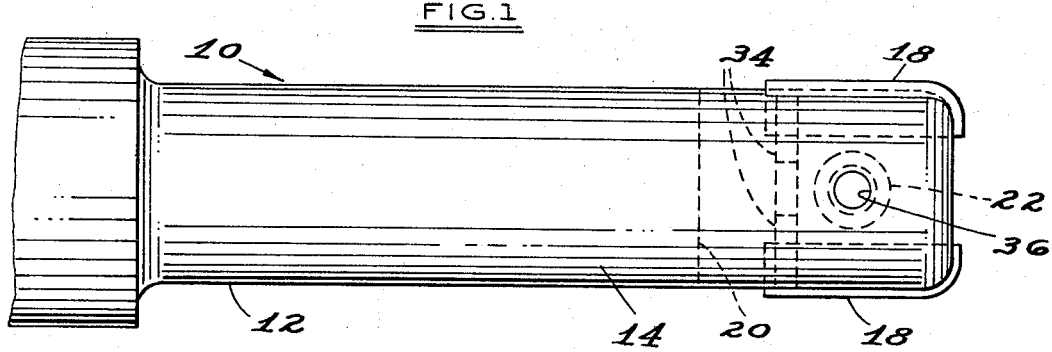
FIG. 1 is a side elevation of an end mill incorporating a pair of inserts.

The cutting tool 10 shown by FIG. 1 includes a body member 12 having a cylindrical shank 14 and with a pair of pockets or grooves 16 provided in the outer periphery of the shank 14 at its terminal end. Carbide inserts 18 with longitudinal cutting edges exposed thereover, are provided within the grooves or pockets 16. An opening or slot 20 is provided in the terminal end of the tool holder shank 14 and intersects the grooves 16. Threaded fastener means 22, engaged through the side wall of the shank 14, and across the opening 20, are provided to close the openings sufficiently to hold the inserts 18 securely seated in the grooves or pockets 16.

The body member or tool holder part 12 may be other than cylindrical and have other than a cylindrical shank 14 as shown. However, the grooves or pockets 16 are intended to lie on the outermost periphery of the shank part and so that the cutting edges of the inserts, as disposed in the grooves, will lie beyond the outer periphery of the tool holder as rotated on an axis extending longitudinally therethrough.

The grooves or pockets 16 are preferably cylindrical in shape and have their own axis spaced less than the radial distance from the rotational axis of the tool holder member. They have less than half of one cylindrical side open on the cylindrical surface of the tool holder shank 14 and thereby form end wall pockets, easily provided by boring or jig grinding in one simple operation, and are receptive of the inserts in the open ends thereof. The cylindrical wall of the grooves or pockets 16 provides a continuous cylindrical surface particularly advantageous in use with complementary cylindrical formed inserts in providing a good seating surface therefor.

The carbide cutting inserts 18 are made complementary to the grooves or pockets 16 and with cylindrical surfaces, for example, with cylindrical shaped grooves.

Figure 2:
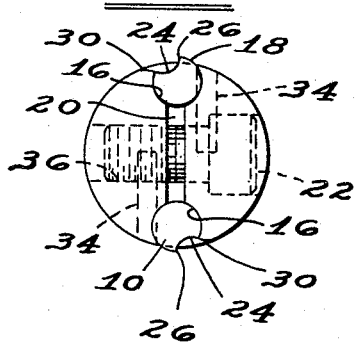
FIG. 2 is an end view of such milling cutter.

In the embodiments shown by FIGS. 1 and 2, the inserts are cylindrical and formed to include a longitudinally extending concave relief groove 24 terminating in a cutting edge 26. This extends substantially the full length of the insert and on just one side, in the embodiment shown, and includes the end which may be formed as shown for end cutting and the like.

Where the relief groove is other than a normal flat, to provide the cutting edge, and is perhaps concave, as shown, the edges of the grooves 16 may also be relieved as at 30 to complement the relief in the cutting insert and produce added chip clearance.

Figure 3:
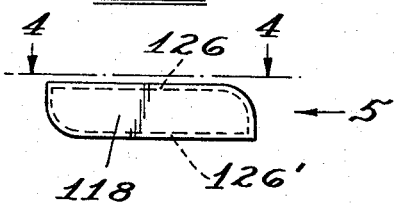
FIG. 3 is a side elevation of a modified partially cylindrical indexable and throw-away insert.
Figure 4:
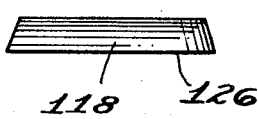
FIG. 4 is a plan view of the modified insert taken along the line 4—4 of FIG. 3.
Figure 5:
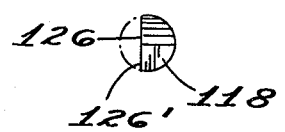
FIG. 5 is an end view of the modified insert as seen in the direction of the arrow 5 of FIG. 3.

The carbide cutting inserts may be also of the shape shown in FIGS. 3-5 and identified 118. These are semi-cylindrical and include a flat chordal relief on one side that provides oppositely disposed cutting edges 126 and 126′. These also extend the full length of the inserts and so that the insert is reversible, end-for-end, in the grooves a brazing fillet may be employed between the insert and its pocket wall to take the place of a portion of the missing cylindrical stock to add rigidity when required.

In both instances, of the cutting inserts 18 and 118 shown, it will be appreciated that the cutting edge and the seating surface for the inserts in the grooves 16 is one continuous cylindrical surface. Also, the inserts can be adjusted about their own axis, or that of the grooves, to vary their rake angle and depth of cut beyond the periphery of the holder.

With oppositely disposed grooves 16 and inserts 18, as shown in FIG. 1, parallel cutting edges are provided with an ideal material clearance similar to cam relief and which can be increased or decreased by lowering the cutting edge relief 24 to within the grooves or pockets. In this latter respect, variations in the shape of the grooves, and the inserts, and their radial distance from the rotational axis of the tool holder provides several innovations which may be envisioned without specific discussion.

The opening or slot 20 in the end of the tool holder shank and intersecting the grooves 16, affords a means of closing the walls of the grooves to hold the inserts 18 securely seated in their desired positions. To facilitate positioning of the inserts in the grooves, access passages 34 are shown provided in the tool holder shank 14. They intersect the marginal side edges of the grooves 16 and enable a pin or like tool to be inserted to establish either or both the longitudinal and rotational position desired for the inserts.

The fastener 22, for closing the end opening 20, is a bolt with its head recessed in the side wall of the tool holder shank 14 on one side and its threaded end in engagement with a threaded hole 36 provided directly across therefrom. After the inserts are positioned, the bolt is turned to close the opening and the grooves sufficiently to keep the inserts securely seated.

From the foregoing, several advantages are most apparent:

Both the shape of the insert and of the receptive pockets or grooves is relatively simple; thus extreme accuracies can be readily maintained in manufacture. Cutting edges and seating surfaces, as mentioned, are part of one continuous cylindrical surface. Accurate positioning of the cutting edges of the inserts and secure fastening is therefore assured.

The grooves or pockets are simple to manufacture with accuracy because the retaining walls and bottom are one continuous cylindrical surface which can be produced by boring or jig grinding in one simple operation, as mentioned.

Rake angles can be accomplished as desired by simply loosening the clamping means and rotating the inserts as required. A concave surface in the flat portion allows still greater choice.

Almost any shape can be produced on the ends of the inserts depending only on the requirements in relation to the size of the insert and the available surface.

The tool provided may be used to obtain accurate diameter end mills, for reamers, grooving, and almost any type surface, for face mills, for finishing and cutting square shoulders, boring tools for wide-shoulder cuts, tracing tools and almost any job where accuracy demands that the insert be securely held as first positioned for the accuracy desired.

While a preferred embodiment and one modification have been described above in detail, it will be understood that numerous modifications might be resorted to without departing from the scope of the invention as defined in the following claims.

We claim:
1. A cutting tool comprising a member rotatable about an axis extending therethrough and having a plurality of grooves provided at one end and on the outer periphery thereof concentrically of said axis, cutting inserts receptive within said grooves and formed to extend thereover and beyond the outer periphery of said member, a terminal opening formed in the end of said member and intersecting said grooves, and means extending through said member and across said terminal opening for closing said opening in part and holding said inserts retained in said grooves.

2. The cutting tool of claim 1, said inserts and grooves being formed to complement each other and for rotational indexing of said inserts in said grooves.

3. The cutting tool of claim 2, said grooves being cylindrical and having less than a half of one side open on the peripheral surface of said member, and said inserts including a longitudinal cutting edge exposed through the open side of said grooves and indexable relative to the outer peripheral surface of said member.

4. The cutting tool of claim 2, said member being cylindrical and said grooves being cylindrical and diametrically spaced across said member with the axes thereof located radially inward of the outer periphery of said member a distance less than the radius thereof.

5. The cutting tool of claim 4, said inserts being cylindrical and including a longitudinally extending relief groove terminating in a cutting edge substantially the full length thereof and on at least one side thereof, and said grooves having a side edge thereof relieved to provide with the relief groove of said inserts added cutting clearance.

6. The cutting tool of claim 3, the cutting edge and seating surface of said inserts in said grooves being provided on one continuous cylindrical surface.

7. The cutting tool of claim 3, said inserts having a semi-cylindrical shape and including a chordal relief on one side providing oppositely disposed cutting edges extending substantially the full length thereof for reversible use in the end-for-end repositioning of said inserts in said grooves.

References Cited
UNITED STATES PATENTS

| | | | |
|---|---|---|---|
| 2,282,306 | 5/1942 | Cross | 29—105 |
| 2,621,548 | 12/1952 | Williams | 29—105 |
| 3,125,799 | 5/1964 | Bennett | 29—105 |
| 3,170,224 | 2/1965 | Johnson | 29—105 |
| 3,187,408 | 6/1965 | Tittevud | 29—96 |

HARRISON L. HINSON, *Primary Examiner.*